United States Patent

[11] 3,617,733

| [72] | Inventor | Bob R. Adams<br>Bird-Adams, Co., Inc., P.O. Box 38,<br>Doraville, Ga. 30340 |
|---|---|---|
| [21] | Appl. No. | 735,764 |
| [22] | Filed | June 10, 1968 |
| [45] | Patented | Nov. 2, 1971 |

[54] FLOATING UTILITY LIGHT
5 Claims, 3 Drawing Figs.

[52] U.S. Cl. .................................................. 240/26,
240/11.2, 240/41.5
[51] Int. Cl. ................................................. F21v 31/00
[50] Field of Search ........................................ 240/26,
11.2 EP, 3, 11.4, 78 LD, 41.5

[56] References Cited
UNITED STATES PATENTS

| 1,183,147 | 5/1916 | White et al. | 240/41.5 X |
| 3,065,340 | 11/1962 | Mead et al. | 240/41.5 |
| 3,177,356 | 4/1965 | Worden | 240/41.5 |
| 3,250,910 | 5/1966 | Authier | 240/10.63 |
| 2,095,761 | 10/1937 | Phillips | 240/11.2 EP |
| 2,167,184 | 7/1939 | Phillips | 240/11.2 EP |
| 2,948,806 | 8/1960 | Anderson | 240/10.66 |
| 3,107,864 | 10/1963 | Kinnear et al. | 240/3 |
| 3,364,347 | 1/1968 | Russell | 240/26 |
| 3,464,139 | 9/1969 | Eggers | 240/26 X |

FOREIGN PATENTS

| 1,037,457 | 7/1966 | Great Britain | 240/78 LD |
| 908,158 | 4/1954 | Germany | 240/26 |

*Primary Examiner*—Samuel S. Matthews
*Assistant Examiner*—Robert P. Greiner
*Attorney*—Jones and Thomas ABSTRACT: A floating utility light including a light bulb and a housing including a frame defining a central aperture through which the enlarged portion of the light bulb protrudes, and a concave section connected at its periphery to the edges of the frame and extending over the rear portion of the light bulb to which the electrical connections are made. The housing is substantially water impervious and is of low profile so that it floats with the portion of the bulb extending through the aperture of the frame immersed in water. The concave portion of the housing is translucent, so that when the light bulb is illuminated, the concave portion of the housing will glow or emit dispersed light, while a beam of light will be directed into the water. An arcuate handle is connected at its ends to the concave housing for convenience in retrieving the utility light from the water and for handling the light in other situations.

PATENTED NOV 2 1971 3,617,733

INVENTOR
BOB R. ADAMS

BY *Jones & Thomas*

ATTORNEYS

FLOATING UTILITY LIGHT

BACKGROUND OF THE INVENTION

The outdoorsman frequently needs a portable source of light for carrying on night time activities, such as when fishing, hunting, or performing activities associated with these and other sporting activities. While various flashlights and other small portable lights have been developed, the sportsman frequently needs a stronger light, and a light which is more reliable and last longer than the conventional flashlight. When fishing, the sportsman frequently likes to shine a light below the surface of the water to attract fish, and it is desirable for the light of the sportsman to be water proof, and that the light be made so that it floats on the surface of the water with the major portion of the light emitted being directed below the surface of the water. When a light is used in this manner, it is sometimes desirable that the light also be visible from above the surface of the water from some distance away from the light, so that the location of the fisherman can be determined by people in boats or on the shore.

SUMMARY OF THE INVENTION

Briefly described, the present invention comprises a utility light connectable to a battery source, such as a 12-volt automobile battery, which is conveniently used on land and water, and which is constructed to float on the surface of water with the major portion of the light emitted therefrom being directed into the water, and with the remaining portion of the emitted light being dispersed above the surface of the water. The utility light includes a bulb having the enlarged portion thereof surrounded by a frame, and with the rear portion thereof enclosed by a concave housing. The bulb, frame and concave housing are sealed to each other so that the utility light is substantially waterproof, yet the enlarged portion of the bulb is arranged so that it is partially immersed in the water when the utility light floats on the surface of the water.

Thus, it is an object of this invention to provide a utility light which is suitable for use on land as well as on water, and which is waterproof and floats on the surface of a body of water.

Another object of this invention is to provide a light which floats on the surface of a body of water, and which directs a major portion of the emitted light down into the body of the water, and disperses the remaining portion of the emitted light above the surface of the water.

Another object of this invention is to provide a light which is floatable on the surface of a body of water and arranged to direct a major portion of its emitted light down into the body of the water while dispersing the remaining portion of its emitted light above the surface of the water for the purpose of creating a marker or light buoy.

Another object of this invention is to provide a utility light which can be conveniently used in various situations, which is economical to manufacture, durable, waterproof, rustproof, and which can be used as a source of light and as a warning light.

Other objects, features, and an advantages of the present invention will become apparent upon reading the following specification, when taken in conjunction with the accompanying drawing.

DESCRIPTION OF THE PREFERRED EMBODIMENT

Figure 1:
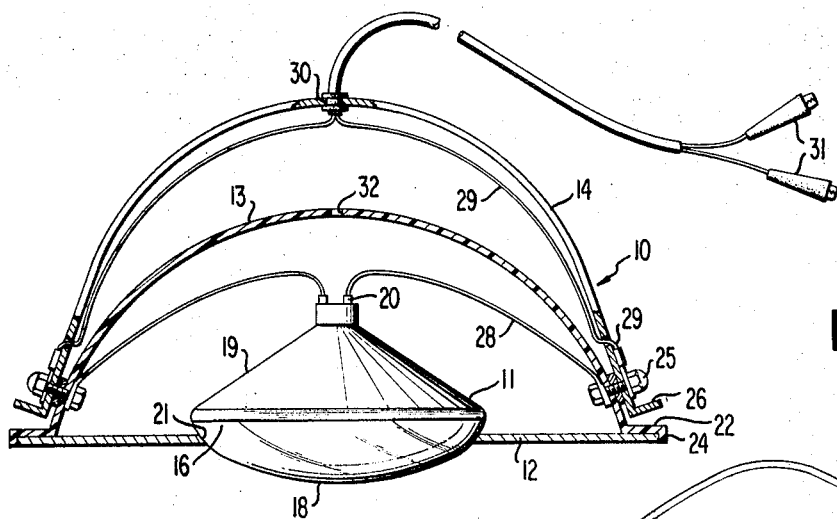
FIG. 1 is a side cross-sectional view of the utility light.

Referring now more particularly to the drawing, in which like numerals indicate like parts throughout the several views, FIG. 1 shows utility light 10 which comprises light bulb 11, frame 12, concave housing 13, and handle 14. Bulb 11 is a conventional automobile head lamp and includes an enlarged bulb portion 16 having a refracting lens 18, and a conical reflecting portion 19. Electrical connections 20 are positioned at the apex of conical reflecting portion 19.

Frame 12 defines central opening 21 which surrounds and contacts enlarge bulb portion 16 in sealing relationship. Refracting lens 18 extends and protrudes through opening 21.

Figure 2:
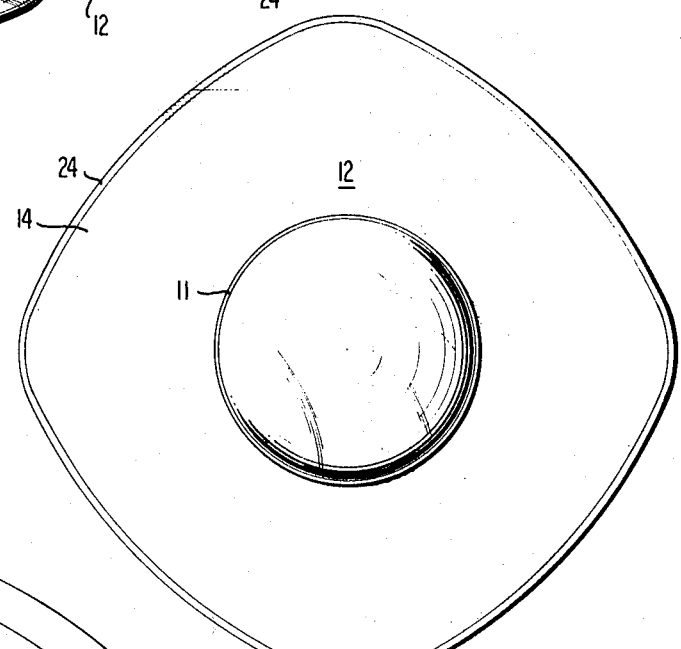
FIG. 2 is a bottom view of the utility light.
Figure 3:
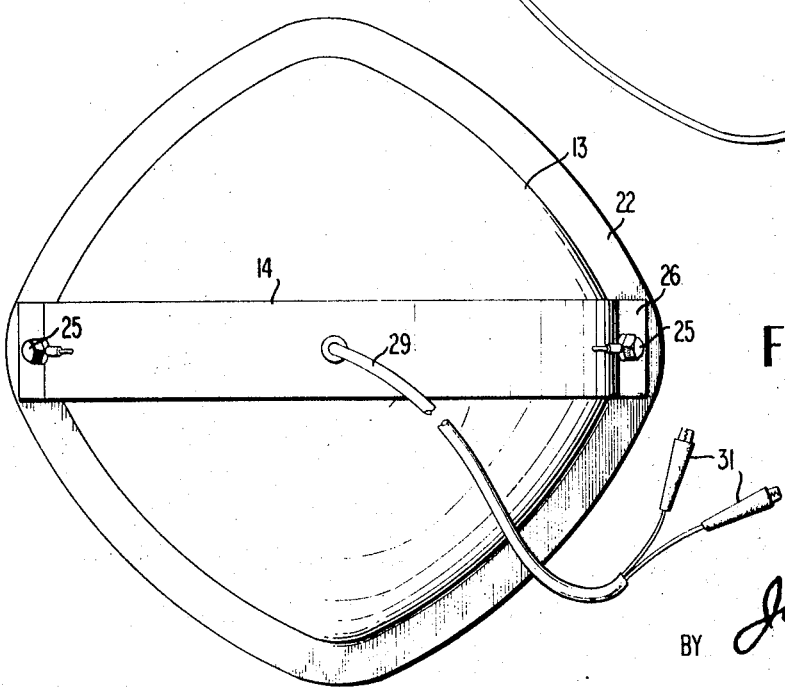
FIG. 3 is a top plan view of the utility light.

As is shown in FIG. 2, frame 12 is constructed in a generally rounded rectangular shape, and concave housing 13 includes outwardly extending flange 22 which contacts frame 12 at its outer perimeter, and downwardly extending flange 24 which surrounds the periphery of frame 12. Thus, the lower edge of concave housing 13 conforms in shape to the periphery of frame 12.

Handle 14 is connected at its ends to concave housing 13 by means of bolts 25. Handle 14 is curved along its length in a radius less than the curvature of concave housing 13 so that it protrudes above concave housing 13. The ends 26 of handle 14 are bent laterally away from housing 13 to form outwardly extending tabs. Internal conductors 28 are connected between electrical connections 20 of bulb 11 and bolts 25. External conductors 28 are connected to bolts 25 and extend through openings 29 of handle 14, and extend along the bottom surface of handle 14 until they reach the apex of the handle, where they extend through opening 30 and back through handle 14, and terminate in alligator jaw connectors 31. With this arrangement, the portions of external conductors 28 that extend beneath handle 14 are pivotal with handle 14 about concave housing 13. When utility light 10 is not in use, the length of electrical conductors 28 extending beyond handle 14 can be wrapped around tabs 26 for storage purposes.

As is shown in FIG. 1, frame 12 provides a large area floating platform for utility light 10, while concave housing 13 provides a low profile sealed housing. Thus, utility light 10 can be placed on the surface of a body of water with frame 12 and enlarged bulb portion 16 of bulb 11 contacting the water, and utility light 10 will float with its concave housing 13 above the water surface. Thus, when alligator connectors 31 are connected to a battery source, the major portion of the light emitted from bulb 11 will be directed down into the body of water. Concave housing 13 is fabricated of a translucent material, and frame 12 surrounds bulb 11 at a position displaced downwardly from the conical reflecting portion 19 so that a portion of the light emitted from bulb 11 is dispersed within the confines of housing 13. Thus, a portion of the light emitted from bulb 11 will pass through concave housing 13, thus illuminating concave housing 13. Concave housing 13 can be fabricated of any color, including red, white, or any other conventional warning or illuminating color for the purpose of marking a fishing site or warning other persons on the water of the presence of the fishermen or swimmer, etc.

While frame 12 is sealed about its opening 21 to bulb 11 and about its periphery to concave housing 13 to prevent water from entering utility light 10, breather aperture 32 extends through concave housing 13 at its apex for the purpose of draining any water from the housing which might leak into the housing. While frame 12, concave housing 13, and handle 14 can be constructed from virtually any water imperious material, the lights manufactured thus far have been fabricated with flexible plastic frames and housings. The flexible plastic material renders the frames and housing of utility light 10 highly durable, and if any water enters the housing, the light can be inverted and squeezed to eject the water through aperture 32.

When utility light 10 is utilized on land, handle 14 provides a convenient hand hold for manipulating the light, and a convenient handle for suspending the light from an overhead support, such as limb of a tree or the like. When used on water, a pole can be inserted between the housing and the handle of the light to retrieve the light from the water or reposition the light on the water.

While alligator clamps 31 have been shown as the means for connecting utility light 10 to a source of electrical power, various other arrangements can be used, such as an automobile cigarette lighter plug, etc. Of course, any length of external electrical wire can be utilized for connecting utility light 10 to its source of electricity, and bulb 11 can be chosen to be compatible with a 6-volt or 12-volt automobile battery.

In order that utility light 10 be long lasting and durable, bolts 25 and alligator connectors 31 are zinc plated. Since the remaining exposed elements are either plastic or glass, utility light 10 will be virtually rust and corrosion free.

It will be obvious to those skilled in the art that many variations may be made in the embodiments chosen for the purpose of illustrating the present invention without departing from the scope thereof as defined by the appended claims.

I claim:

1. A light fixture comprising a lamp including a large diameter bulb portion with a generally conical reflecting portion and electrical connections at the apex of said reflecting portion, a substantially flat frame defining an opening surrounding said bulb portion at a line of contact spaced from said reflecting portion, and a concave translucent housing connected at its edges to the outer edges of said frame and extending over said electrical connections of said lamp to form with said frame and lamp a substantially waterproof enclosure, the distance across said frame being at least twice the distance from the exposed portion of said bulb portion to the portion of said concave housing adjacent the electrical connections of said lamp.

2. The light fixture of claim 1 and wherein said concave housing is fabricated of a flexible plastic material and defines an aperture therein so that the light fixture can be oriented in an attitude where said aperture faces downwardly and the concave housing squeezed to expel any liquid trapped therein.

3. The light fixture of claim 1 and further including a handle curved along its length in a radius less than the radius of curvature of said concave housing, said handle being joined at its ends to opposite sides of said concave housing at positions closely spaced from said frame, and electrical conducting means extending from the center portion of said handle, to the ends of said handle, through said concave housing at the ends of said handle, and to the electrical connections of said conical reflecting portion.

4. A utility light comprising a lamp including a large diameter convex lens, a reflecting portion joined to said lens and electrical connections positioned centrally of said reflecting portion, a generally flat frame defining a central opening joined to said lens inwardly of the edge of the lens and extending outwardly away from said lens in a plane generally perpendicular to the central axis of said convex lens to cause light emitted from said lens to illuminate both sides of said frame, and a concave translucent housing connected at its edges to said frame in said plane, said housing extending over said reflecting portion and electrical connections of said lamp to form with said frame and lamp a substantially water proof enclosure.

5. The utility light of claim 4 and wherein said lens is convex and protrudes through said frame member.

* * * * *